(12) United States Patent
Lazarowitz

(10) Patent No.: US 6,584,988 B1
(45) Date of Patent: *Jul. 1, 2003

(54) PROCESS FOR REMOVING CONTAMINANTS FROM WATER

(75) Inventor: Virginia Lazarowitz, Hatfield, PA (US)

(73) Assignee: Cognis Corp., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/183,695

(22) Filed: Oct. 30, 1998

(51) Int. Cl.[7] ................................. B08B 9/20
(52) U.S. Cl. .................. 134/25.1; 134/29; 210/708; 252/89.1; 510/350; 588/249
(58) Field of Search ............... 134/25.1, 29; 588/249; 210/708; 252/89.1; 510/350

(56) References Cited

U.S. PATENT DOCUMENTS

| | | | |
|---|---|---|---|
| 1,985,424 A | 12/1934 | Piggott | 260/124 |
| 2,965,576 A | 12/1960 | Wilson | 252/137 |
| 4,524,009 A * | 6/1985 | Valenty | 252/89.1 |
| 5,086,717 A | 2/1992 | McCrossan | 110/346 |
| 5,194,639 A | 3/1993 | Connor et al. | 554/66 |
| 5,266,690 A | 11/1993 | McCurry, Jr. et al. | 536/18.6 |
| 5,334,764 A | 8/1994 | Scheibel et al. | 564/487 |
| 5,449,477 A * | 9/1995 | Eckhardt | 252/186.1 |
| 5,668,098 A * | 9/1997 | Gutierrez et al. | 510/350 |
| 5,700,331 A * | 12/1997 | Thomas et al. | 134/29 |
| 5,725,470 A | 3/1998 | Lazarowitz et al. | 588/249 |
| 5,741,427 A | 4/1998 | Watts et al. | |
| 5,785,887 A * | 7/1998 | Steltenkamp et al. | 252/186.42 |
| 5,853,596 A * | 12/1998 | Gibson | 210/708 |
| 5,968,370 A * | 10/1999 | Trim | 210/723 |

* cited by examiner

*Primary Examiner*—Randy Gulakowski
(74) *Attorney, Agent, or Firm*—John E. Drach; Steven J. Trzaska

(57) ABSTRACT

A process for the remediation of soil, rock or water contaminated with volatile organic compounds involving: (1) forming an emulsifier comprising: (a) a sugar surfactant; and (b) a nonionic surfactant, other than the sugar surfactant which, when combined with the sugar surfactant, provides a hydrophilic-lipophilic balance of from about 8.0 to about 13.0; (2) mixing the emulsifier with the volatile organic compounds to form a stable emulsion; and (3) removing the stable emulsion from the soil, rock or water.

14 Claims, No Drawings

PROCESS FOR REMOVING CONTAMINANTS FROM WATER

CROSS-REFERENCE TO RELATED APPLICATIONS

Not Applicable.

STATEMENT REGARDING FEDERALLY SPONSORED RESEARCH OR DEVELOPMENT:

Not Applicable.

BACKGROUND OF THE INVENTION

The present invention generally relates to a process for water remediation. More particularly, the present invention provides a process for emulsifying and subsequently removing contaminants from water by combining them with a mixture of an alkyl polyglycoside and a fatty alcohol having from 12 to 14 carbon atoms.

Soil can become contaminated by volatile organic compounds (VOC's) in a variety of ways. Leaking fuel tanks and pipelines, either above ground or below, frequently contaminate soil with gasoline or diesel fuel. Underground tanks and pipelines can be particularly prone to leaks as they may have been in use for many years and, because they are buried in the soil, a slow leak may go undetected for some period of time. Industrial waste discharge and industrial accidents may also contribute to contamination of soil by VOC's.

Aside from the soil itself becoming contaminated, undesirable contaminants can, and often do, enter into both pools of water and aquifers. An aquifer is generally defined as an area of water bearing rock.

In the event that water becomes contaminated, it is insufficient to merely clean the surrounding rock and soil. The water itself must be remediated as well. Heavy contaminants can sink to the bottom of an aquifer, while lighter contaminants may float to the surface of the water. In the event that the contaminants are not removed from the water, because they are water borne they will over time, become redeposited back onto the soil and rock. It is therefore necessary to remove any and all contaminants from both the water, as well as the soil, simultaneously.

Since cleaning in situ is the most preferable way to decontaminate soil and water, the chemicals that are to be used in the cleaning process should be biodegradable and pose no threat to the environment.

BRIEF SUMMARY OF THE INVENTION

The present invention is directed to a process for remediating soil, rock and water containing unwanted contaminants involving the steps of: (1) forming an emulsifier by combining: (a) a sugar surfactant selected from the group consisting of an alkyl polyglycoside having the general formula I:

$$R_1O(R_2O)_b(Z)_a \qquad (I)$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6, a glucamide having the general formula II:

wherein $R_3$ is H, $C_1$–$C_4$ hydrocarbyl, 2-hydroxy ethyl, 2-hydroxy propyl, or a mixture thereof, preferably $C_1$–$C_4$ alkyl, more preferably $C_1$ or $C_2$ alkyl, most preferably $C_1$ alkyl (i.e., methyl); and $R_4$ is a $C_5$–$C_3$, hydrocarbyl moiety, preferably straight chain $C_7$–$C_{19}$ alkyl or alkenyl, more preferably straight chain $C_9$–$C_{17}$ alkyl or alkenyl, most preferably straight chain $C_{11}$–$C_{19}$ alkyl or alkenyl, or mixture thereof; and Y is a polyhydroxyhydrocarbyl moiety having a linear hydrocarbyl chain with at least 3 hydroxyls directly connected to the chain, or an alkoxylated derivative (preferably ethoxylated or propoxylated) thereof, and mixtures thereof; and (b) a nonionic surfactant, other than the above-identified sugar surfactant which, when combined with the sugar surfactant, provides an emulsifier having a hydrophilic-lipophilic balance of from about 8.0 to about 13.0; (2) mixing the emulsifier with an unwanted contaminant to form a stable emulsion having a hydrophilic-lipophilic balance of about 10; and (3) removing the stable emulsion from the soil, rock and water.

BRIEF DESCRIPTION OF THE SEVERAL VIEWS OF THE DRAWING

Not Applicable.

DETAILED DESCRIPTION OF THE INVENTION

Other than in the operating examples, or where otherwise indicated, all number expressing quantities of ingredients or reaction conditions used herein are to be understood as being modified in all instances by the term "about".

The alkyl polyglycosides which can be used in the process of the invention to form the emulsifier are those which correspond to formula I:

$$R_1O(R_2O)_b(Z)_a \qquad (I)$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, or PLANTAREN® surfactants from Henkel Corporation, Ambler, Pa., 19002. Examples of such surfactants include but are not limited to:

1. GLUCOPON® 225 Surfactant—an alkyl polyglycoside in which the alkyl group contains 8 to 10 carbon atoms and having an average degree of polymerization of 1.7.
2. GLUCOPON® 425 Surfactant—an alkyl polyglycoside in which the alkyl group contains 8 to 16 carbon atoms and having an average degree of polymerization of 1.55.
3. GLUCOPON® 625 Surfactant—an alkyl polyglycoside in which the alkyl group contains 12 to 16 carbon atoms and having an average degree of polymerization of 1.6.

4. APG® 325 Surfactant—an alkyl polyglycoside in which the alkyl group contains 9 to 11 carbon atoms and having an average degree of polymerization of 1.6.

5. GLUCOPON® 600 Surfactant—an alkyl polyglycoside in which the alkyl group contains 12 to 16 carbon atoms and having an average degree of polymerization of 1.4.

6. PLANTAREN® 2000 Surfactant—a C8-16 alkyl polyglycoside in which the alkyl group contains 8 to 16 carbon atoms and having an average degree of polymerization of 1.4.

7. PLANTAREN® 1300 Surfactant—a $C_{12-16}$ alkyl polyglycoside in which the alkyl group contains 12 to 16 carbon atoms and having an average degree of polymerization of 1.6.

Other examples include alkyl polyglycoside surfactant compositions which are comprised of mixtures of compounds of formula I wherein Z represents a moiety derived from a reducing saccharide containing 5 or 6 carbon atoms; a is a number having a value from I to about 6; b is zero; and $R_1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e., DP2 and DP3 fractions in relation to the sum of all DP fractions. Such compositions are disclosed in U.S. Pat. No. 5,266,690, the entire contents of which are incorporated herein by reference.

Other alkyl polyglycosides which can be used in the compositions according to the invention are those in which the alkyl moiety contains from 6 to 18 carbon atoms and the average carbon chain length of the composition is from about 9 to about 14 comprising a mixture of two or more of at least binary components of alkylpolyglycosides, wherein each binary component is present in the mixture in relation to its average carbon chain length in an amount effective to provide the surfactant composition with the average carbon chain length of about 9 to about 14 and wherein at least one, or both binary components, comprise a Flory distribution of polyglycosides derived from an acid-catalyzed reaction of an alcohol containing 6–20 carbon atoms and a suitable saccharide from which excess alcohol has been separated.

A particularly preferred alkyl polyglycoside for use in the present process is of general formula I wherein $R_1$ is a monovalent organic radical having from 8 to 16 carbon atoms; b is zero; and a is a number having a value of 1.55.

The glucamides which can be used in the process of the invention to form the emulsifier are of general formula (II):

wherein: $R_3$ is H, $C_1$–$C_4$ hydrocarbyl, 2-hydroxy ethyl, 2-hydroxy propyl, or a mixture thereof, preferably $C_1$–$C_4$ alkyl, more preferably $C_1$ or $C_2$ alkyl, most preferably $C_1$ alkyl (i.e., methyl); and $R_4$ is a $C_5$–$C_3$, hydrocarbyl moiety, preferably straight chain $C_7$–$C_{19}$ alkyl or alkenyl, more preferably straight chain $C_9$–$C_{17}$ alkyl or alkenyl, most preferably straight chain $C_{11}$–$C_{19}$ alkyl or alkenyl, or mixture thereof; and Y is a polyhydroxyhydrocarbyl moiety having a linear hydrocarbyl chain with at least 3 hydroxyls directly connected to the chain, or an alkoxylated derivative (preferably ethoxylated or propoxylated) thereof. Y preferably will be derived from a reducing sugar in a reductive amination reaction; more preferably Y is a glycityl moiety. Suitable reducing sugars include glucose, fructose, maltose, lactose, galactose, mannose, and xylose. As raw materials, high dextrose corn syrup, high fructose corn syrup, and high maltose corn syrup can be utilized as well as the individual sugars listed above. These corn syrups may yield a mix of sugar components for Y. It should be understood that it is by no means intended to exclude other suitable raw materials. Y preferably will be selected from the group consisting of $-CH_2-(CHOH)_n-CH_2OH$, $-CH(CH_2OH)-(CHOH)_{n-1}-CH_2OH$, $-CH_2-(CHOH)_2(CHOR')(CHOH)-CH_2OH$, where n is an integer from 3 to 5, inclusive, and R' is H or a cyclic mono- or poly-saccharide, and alkoxylated derivatives thereof. Most preferred are glycityls wherein n is 4, particularly $-CH_2-(CHOH)_4-CH_2OH$. Therefore, when, for example, $R_3$ is methyl, $R_4$ dodecyl; and Y is $-CH_2-(CHOH)_4-CH_2OH$, the compound in question is referred to as dodecyl N-methylglucamide.

Methods for making glucamides (polyhydroxy fatty acid amides) are known in the art. In general, polyhydroxy fatty acid amides can be made by reductively aminating a reducing sugar reacting with an alkyl amine to form a corresponding N-alkyl polyhydroxyamine and then reacting the N-alkyl polyhydroxyamine with a fatty aliphatic ester or triglyceride to form the N-alkyl, polyhydroxy fatty acid amide. Processes for making polyhydroxy fatty acid amides are disclosed in U.S. Pat. Nos. 1,985,424; 2,965,576; 5,194,639; and 5,334,764, the entire contents of each of which is incorporated herein by reference.

The nonionic surfactants, other than the above-identified sugar surfactants, which are suitable for making the emulsifier used in the present invention are those having a hydrophilic-lipophilic balance of from about 4.0 to about 8.0. Examples of which include, but are not limited to, fatty alcohols having from about 8 to about 14 carbon atoms, monoglycerides, sorbitan monooleates, ethoxylated linear alcohols, block copolymers of propylene oxide and ethylene oxide, sorbitan trioleates, sorbitan tristearates, nonylphenol ethoxylates, sorbitan monostearates, POE (2) stearyl alcohol, POE (2) oleyl alcohol, diethylene glycol monooleate, diethylene glycol monostearate, methyl glucoside dioleate, glycerol monostearate, diethylene glycol monolaurate, tetraglyceryl monooleate, tetraglyceryl monostearate, polyethylene glycol oleyl ether, polyethylene glycol alkyl ether, sorbitan monopalmitate, and calcium dodecyl benzene sulfonate.

According to one embodiment of the invention, the emulsifier is prepared by mixing from about 70 to about 99% by weight, and preferably about 80% by weight, of the sugar surfactant with from about 1 to about 30% by weight, and preferably about 20% by weight, of the above-disclosed nonionic surfactant, to form an emulsifier having an HLB of from about 8 to about 13, and preferably about 0.

Once the emulsifier is formulated, it is then mixed with the contaminants in the soil, rock and water, to form a highly stable emulsion characterized by the emulsion having an HLB value of from about 10.4 to about 10.8, and preferably 10.6, thus rendering it highly stable.

Examples of the types of contaminants on which the process of the present invention can be used include, but are not limited to, water-insoluble hydrocarbon containing contaminants such as diesel fuel, pesticides, and the like.

With respect to the particulars as to the equipment and methods used to physically retrieve the contaminants after they have been emulsified, the prior art is replete with information regarding its accomplishment. For example, U.S. Pat. No. 5,086,717 to McCrossan, incorporated herein by reference, represents merely one example of the state of the art in terms of apparatus and method which may be used to physically remove and dispose of the emulsified contaminants formed by the present process. Any other suitable apparatus and method may similarly be employed.

The present invention will be better understood from the examples which follow, all of which are intended to be illustrative only and not meant to unduly limit the scope of the invention. Unless otherwise indicated, percentages are on a wt-% actives basis.

EXAMPLE 1

An emulsifier was prepared having the following formulation:

| Component | % by weight |
| --- | --- |
| (a) GLUCOPON ® 225 (100% actives) | 87.5 |
| (b) LOROL ® 1214 A* | 12.5 |
| | 100.0 |

*A blend of $C_{12}$ and $C_{14}$ fatty alcohols in a wt-% breakdown of 65–75% $C_{12}$ fatty alcohols, 22–28% $C_{14}$ fatty alcohols, and the balance $C_{10}$, $C_{16}$, and $C_{18}$ fatty alcohols.

EXAMPLE 2

An emulsifier was prepared as in Example I having the following formulation:

| Component | % by weight |
| --- | --- |
| (a) GLUCOPON ® 225 | 70 |
| (b) LOROL ® 1214 A | 30 |
| | 100 |

EXAMPLE 3

An emulsifier was prepared as in Example 1 having the following formulation:

| Component | % by weight |
| --- | --- |
| (a) GLUCOPON ® 600 | 70 |
| (b) ALFONIC ® 1412-40* | 30 |
| | 100 |

*A linear alcohol ethoxylated with 40% ethylene oxide.

The emulsifiers formed in Examples 1–3 were then mixed with various types of VOC contaminants to form emulsions. The stability of these emulsions was then tested by mixing, in separate 100 ml graduated cylinders, a 2% aqueous diesel fuel solution containing synthetic sea water, and a sufficient amount of the emulsifiers of Examples 1–3 to form 4% total actives solutions of each test sample. The graduated cylinders were then inverted 50 times to form an emulsion and allowed to stand at room temperature. The contents were then checked periodically for separation of the diesel fuel from the emulsion at varying temperatures. Table 1 summarizes the formulations and stability results.

TABLE 1

| Ex. | Contaminant | % /wt soln. | HLB | stability @ room temp. | stability @ 140° F. |
| --- | --- | --- | --- | --- | --- |
| 1 | diesel fuel | 2% | 10.45 | stable >6 hrs. | stable >6 hrs. |
| 2 | diesel fuel | 2% | 10.45 | stable >6 hrs. | stable >6 hrs. |
| 3 | diesel fuel | 2% | 10.45 | stable >6 hrs. | stable >6 hrs. |

Thus, it can be seen from the results obtained above that emulsions formed by employing the emulsifiers of the present invention are stable over a significant temperature range, allowing for the retrieval of contaminants such as diesel fuel in a safe and economical manner.

What is claimed is:

1. A process for the remediation of soil, rock or water contaminated with volatile organic compounds comprising:
   (1) forming an emulsifier comprising:
      (a) a sugar surfactant selected from the group consisting of an alkyl polyglycoside having the general formula I:

$$R_1O(R_2O)_b(Z)_a \qquad (I)$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6, a glucamide having the general formula II:

$$\begin{array}{c} \quad\;\; O \quad R_3 \\ \quad\;\; \| \quad\;\; | \\ R_4-C-N-Y \end{array} \qquad (II)$$

wherein $R_3$ is H, $C_1$–$C_4$ hydrocarbyl, 2-hydroxy ethyl, 2-hydroxy propyl, or a mixture thereof, and $R_4$ is a $C_5$–$C_3$, hydrocarbyl moiety, preferably straight chain $C_7$–$C_{19}$ alkyl or alkenyl, or mixtures thereof; and Y is a polyhydroxyhydrocarbyl moiety having a linear hydrocarbyl chain with at least 3 hydroxyls directly connected to the chain, or an alkoxylated derivative thereof, and mixtures thereof; and
(b) a nonionic surfactant, other than the sugar surfactant which, when combined with the sugar surfactant, provides a hydrophilic-lipophilic balance of from about 8.0 to about 13.0;
(2) mixing the emulsifier with the volatile organic compounds to form a stable emulsion; and
(3) removing the stable emulsion from the soil, rock or water.

2. The process of claim 1 wherein the sugar surfactant is present in the emulsifier in an amount of from about 70 to about 99% by weight, based on the weight of the emulsifier.

3. The process of claim 2 wherein in formula I of the alkyl polyglycoside, $R_1$ is a monovalent organic radical having from 8 to 16 carbon atoms, b is zero, and a has a value of 1.55.

4. The process of claim 1 wherein the sugar surfactant is the alkyl polyglycoside of formula I.

5. The process of claim 1 wherein the sugar surfactant is the glucamide II.

6. The process of claim 1 wherein the nonionic surfactant is present in the emulsifier in an amount of from about 1 to about 30% by weight, based on the weight of the emulsifier.

7. The process of claim 1 wherein the nonionic surfactant is selected from the group consisting of a fatty alcohol having from about 8 to about 14 carbon atoms, a monoglyceride, a sorbitan monooleate, an ethoxylated linear alcohol, a block copolymer of propylene oxide and ethylene oxide, a sorbitan trioleate, a sorbitan tristearate, a nonylphenol ethoxylate, a sorbitan monostearate, POE (2) stearyl alcohol, POE (2) oleyl alcohol, diethylene glycol monooleate, diethylene glycol monostearate, methyl glucoside dioleate, glycerol monostearate, diethylene glycol monolaurate, tetraglyceryl monooleate, tetraglyceryl monostearate, polyethylene glycol oleyl ether, polyethylene glycol alkyl ether, sorbitan monopalmitate, and calcium dodecyl benzene sulfonate, and mixtures thereof.

8. The process of claim 7 wherein the nonionic surfactant is a fatty alcohol having from about 8 to about 14 carbon atoms.

9. The process of claim 1 wherein the emulsion has a hydrophilic-lipophilic balance of from about 10.4 to about 10.8.

10. The process of claim 1 wherein the sugar surfactant and the nonionic surfactant are mixed in a percent by weight ratio of about 80:20, respectively, based on the weight of the emulsifier.

11. A process for the remediation of soil, rock or water contaminated volatile organic compounds comprising:
(1) forming an emulsifier comprising:
(a) an alkyl polyglycoside having the general formula I:

wherein $R_1$ is a monovalent organic radical having from 8 to 16 carbon atoms, b is zero, and a has a value of 1.55; and
(b) a fatty alcohol having from about 8 to about 14 carbon atoms which, when combined with the alkyl polyglycoside, provides a hydrophilic-lipophilic balance of from 10.4 to 10.8;
(2) mixing the emulsifier with the volatile organic compounds to form a stable emulsion; and
(3) removing the stable emulsion from the soil, rock or water.

12. A process for the remediation of soil, rock or water contaminated with volatile organic compounds comprising:
(1) forming an emulsifier comprising:
(a) a glucamide having the general formula II:

wherein $R_3$ is H, $C_1$–$C_4$ hydrocarbyl, 2-hydroxy ethyl, 2-hydroxy propyl, or a mixture thereof, and $R_4$ is a $C_5$–$C_3$, hydrocarbyl moiety, preferably straight chain $C_7$–$C_{19}$ alkyl or alkenyl, or mixtures thereof; and Y is a polyhydroxyhydrocarbyl moiety having a linear hydrocarbyl chain with at least 3 hydroxyls directly connected to the chain, or an alkoxylated derivative thereof; and
(b) a fatty alcohol having from about 8 to about 14 carbon atoms which, when combined with the alkyl polyglycoside, provides a hydrophilic-lipophilic balance of from 10.4 to 10.8;
(2) mixing the emulsifier with the volatile organic compounds to form a stable emulsion; and
(3) removing the stable emulsion from the soil, rock or water.

13. A process for the remediation of soil, rock or water contaminated with volatile organic compounds comprising:
(1) forming an emulsifier comprising:
(a) about 80% by weight of an alkyl polyglycoside having the general formula I:

wherein $R_1$ is a monovalent organic radical having from 8 to 16 carbon atoms, b is zero, and a has a value of 1.55; and
(b) about 20% by weight of a fatty alcohol having from about 8 to about 14 carbon atoms which, when combined with said alkyl polyglycoside, provides a hydrophilic-lipophilic balance of from 10.4 to 10.8;
(2) mixing the emulsifier with the volatile organic compounds to form a stable emulsion; and
(3) removing the stable emulsion from the soil, rock or water.

14. A process for the remediation of soil, rock or water contaminated with volatile organic compounds comprising:
(1) forming an emulsifier comprising:
(a) about 80% by weight of a glucamide having the general formula II;

wherein $R_3$ is H, $C_1$–$C_4$ hydrocarbyl, 2-hydroxy ethyl, 2-hydroxy propyl, or a mixture thereof, and $R_4$ is a $C_5$–$C_{31}$ hydrocarbyl moiety, preferably straight chain $C_7$–$C_{19}$ alkyl or alkenyl, or mixtures thereof; and Y is a polyhydroxyhydrocarbyl moiety having a linear hydrocarbyl chain with at least 3 hydroxyls directly connected to the chain, or an alkoxylated derivative thereof; and
(b) about 20% by weight of a fatty alcohol having from about 8 to about 14 carbon atoms which, when combined with said alkyl polyglycoside, provides a hydrophilic-lipophilic balance of from 10.4 to 10.8;
(2) mixing the emulsifier with the volatile organic compounds to form a stable emulsion; and
(3) removing the stable emulsion from soil, rock or water.

* * * * *